United States Patent
Banks et al.

(10) Patent No.: US 6,352,220 B1
(45) Date of Patent: Mar. 5, 2002

(54) HELICOPTER TAIL BOOM WITH VENTING FOR ALLEVIATION AND CONTROL OF TAIL BOOM AERODYNAMIC LOADS AND METHOD THEREOF

(75) Inventors: Daniel W. Banks, Tehachapi, CA (US); Henry L. Kelley, Lanexa, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/586,603

(22) Filed: Jun. 2, 2000

(51) Int. Cl.[7] ............................................. B64C 27/82
(52) U.S. Cl. ................. 244/17.19; 244/12.5; 244/17.11
(58) Field of Search ............................. 244/51, 17.19, 244/17.11, 207, 208, 52, 73 C, 12.5; 239/265.27, 265.29

(56) References Cited

U.S. PATENT DOCUMENTS

| | | | |
|---|---|---|---|
| 2,518,697 A | * 8/1950 | Lee | |
| 2,941,760 A | 6/1960 | Griffith | ..................... 244/119 |
| 3,047,254 A | * 7/1962 | Spearman et al. | |
| 3,510,087 A | * 5/1970 | Strickland | |
| 3,794,274 A | 2/1974 | Eknes | ..................... 244/130 |
| 3,807,662 A | * 4/1974 | Velazquez | |
| 3,957,226 A | * 5/1976 | Daggett et al. | |
| 3,966,144 A | 6/1976 | Gabriel | ..................... 244/17.11 |
| 3,966,145 A | 6/1976 | Wiesner | ..................... 244/17.11 |
| 3,986,681 A | 10/1976 | Parkinson | ..................... 244/1 A |
| 4,033,247 A | 7/1977 | Murphy | ..................... 98/119 |
| 4,200,252 A | * 4/1980 | Logan et al. | |
| 4,660,785 A | * 4/1987 | Munski | |
| 4,708,305 A | 11/1987 | Kelley et al. | ............ 244/17.19 |
| 4,809,930 A | 3/1989 | Ballerio et al. | ........... 244/17.11 |
| 4,948,068 A | * 8/1990 | VanHorn | |
| 5,209,430 A | 5/1993 | Wilson et al. | ............ 244/17.19 |
| 5,219,143 A | 6/1993 | Staple et al. | .................. 248/550 |
| 5,232,183 A | * 8/1993 | Rumberger | |
| 5,240,205 A | * 8/1993 | Allongue | |
| 5,390,543 A | 2/1995 | Staple et al. | ................... 73/583 |
| 5,649,678 A | * 7/1997 | Nurick | |
| 5,775,637 A | 7/1998 | Vuillet et al. | ............. 244/17.11 |
| 5,813,625 A | 9/1998 | Hassan et al. | ............ 244/17.11 |
| 5,934,608 A | * 8/1999 | Dockter | |
| 6,021,976 A | * 2/2000 | Exter | |
| 6,036,141 A | * 3/2000 | Clay | |

\* cited by examiner

*Primary Examiner*—Charles T. Jordan
*Assistant Examiner*—T. Dinh
(74) *Attorney, Agent, or Firm*—John H. Kusmiss

(57) ABSTRACT

In at least one embodiment, the apparatus of the invention is a flight vehicle tail assembly having an exterior surface, at least one first vent in the exterior surface, at least one second vent in the exterior surface, and an air passage connecting the at least one first vent to the at least one second vent allowing air to flow therebetween. Where the at least one first vent is located near a high air pressure area acting on the exterior surface during a range of predefined flight conditions. Further, the at least one second vent is located near a low air pressure area acting on the exterior surface during the predefined flight conditions. So that at the predefined flight conditions adverse loads on the tail assembly are reduced by venting air from the high pressure area, through the tail assembly, to the low pressure area. The method of the present invention includes the steps of: receiving air through the at least one first vent in the exterior surface, passing the air through the tail assembly from the at least one first vent to at least one second vent in the exterior surface, and ejecting the air out of the tail assembly at the at least one second vent.

18 Claims, 8 Drawing Sheets

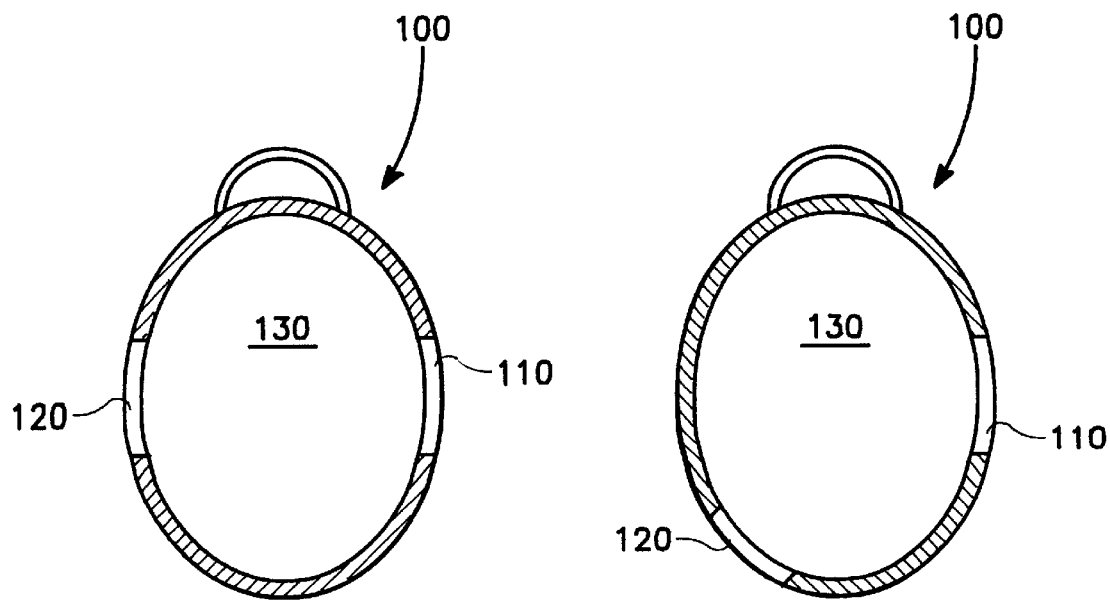
Figure 6a                     Figure 6b
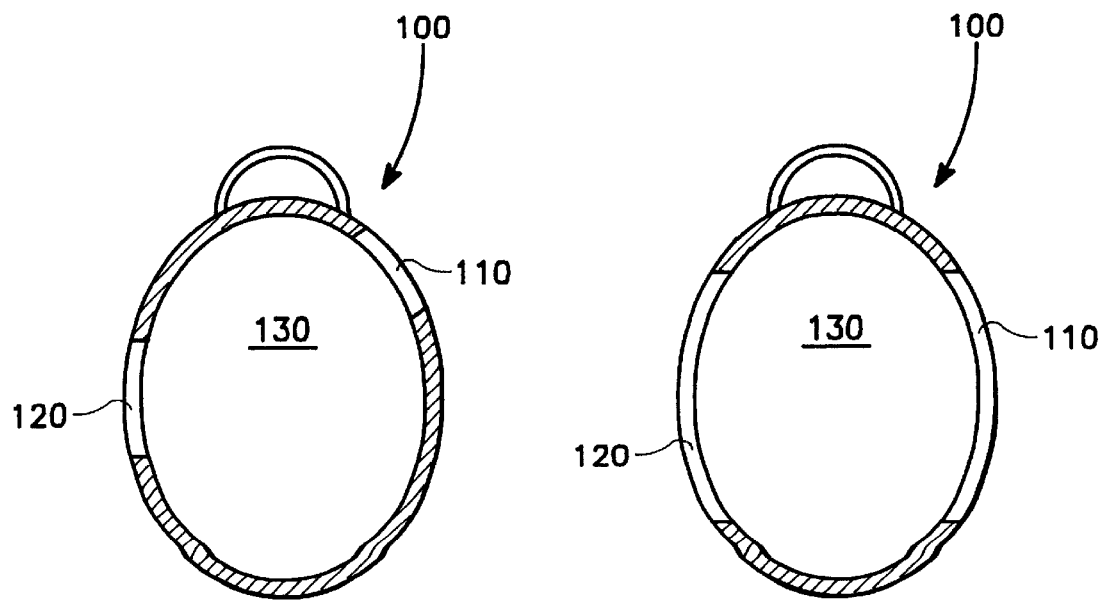
Figure 6c                     Figure 6d

HELICOPTER TAIL BOOM WITH VENTING FOR ALLEVIATION AND CONTROL OF TAIL BOOM AERODYNAMIC LOADS AND METHOD THEREOF

BACKGROUND

A helicopter having a single main rotor must employ some means to counteract the torque produced on the fuselage of the helicopter by the engine turning the rotor blades. That is, the forces exerted by the engine against the rotor blades will, if not counteracted, cause the fuselage of the helicopter to rotate in a direction opposite to that of the main rotor. If allowed to continue, such rotation will quickly cause the helicopter to loose control and thereafter most likely result in a crash.

As shown in FIG. 1, traditionally, to counteract the engine torque, helicopters with single main rotors 20 have used a smaller tail rotor 40 set at the end of a tail boom 30 and positioned in a plane 42 generally perpendicular to the plane 22 of the main rotor 20. The tail rotor provides a sideward force ($f_t$) which when applied to the moment arm (l) of the tail boom produces a counter-torque or moment ($M_t$) which opposes the torque ($M_e$) produced by the engine driving the main rotor 20. As such, the counter-torque ($M_t$) allows the fuselage 10 of the helicopter to be maintained in a constant orientation in a yaw direction. Tail rotors also are normally designed to be able to vary the torque they produce by varying the pitch of the blades 44. This allows the fuselage 10 to be yawed in either direction to provide directional control.

Although clearly functional, this traditional design has many inherent disadvantages. One such disadvantage is that the tail rotor 40 must be powered by the engine, thus reducing the performance of the helicopter. Another disadvantage is that as the fuselage 10 is rotated to one side or the other, relative to the airflow, the tail boom 30 is forced into the airflow and significant forces are exerted on the tail boom 30 by the combination of this airflow and the main rotor downwash. This is shown in FIG. 2. The side forces ($f_s$) cause a moment ($M_s$) to be applied to the helicopter, which must be compensated for by the pilot. This required pilot compensation is particularly troublesome in combat helicopters which must be able to quickly and accurately position the fuselage to perform offensive and defensive maneuvers. In addition, when the side moment ($M_s$) is in the same direction as the engine torque ($M_e$), as shown in FIG. 2, the side moment ($M_s$) adds to the engine torque ($M_e$), then additional power must be drawn by the tail rotor 40 from the engine and further reduces the yaw control available to the pilot. This reduces the overall performance of the helicopter.

A variety of approaches have been taken in the past to attempt to alleviate these problems. One approach has involved the use of various devices placed on the tail boom (e.g. strakes) to distort the air flow over the tail boom and as such reduce the resultant forces. Examples of this approach include those set forth in U.S. Pat. No. 4,708,305, entitled HELICOPTER ANTI-TORQUE SYSTEM USING FUSELAGE STRAKES, issued Nov. 24, 1987 to Kelley et. al., which is hereby incorporated by reference and U.S. Pat. No. 5,209,430, entitled HELICOPTER LOW-SPEED YAW CONTROL, issued May 11, 1993 to Wilson et. al., which is hereby incorporated by reference. Although the location, size and shape of the strakes differ, in each of these two devices the strakes are placed along the length of the tail boom, such that any airflow around (as opposed to along in a longitudinal direction) the tail boom will be spoiled. That is, these devices interrupt the air flow resulting in flow separation. Once separated the flow no longer produces as much side force as when the flow is attached.

Another approach to reducing tail boom loads it embodied in the NOTAR concept. NOTAR, or NO TAil Rotor, is an active system which uses in place of a tail rotor, forced air ejected through longitudinal slots along the boom to control the circulation about the boom and thus the resultant aerodynamic loads created primarily by the down wash of the main rotor. The NOTAR design controls the yaw of the fuselage by increasing or decreasing the lateral aerodynamic loads on the tail boom. Likewise, other concepts have used changes in the geometry of the tail boom to attempt to reduce and control the lateral aerodynamic loads. Essentially, such a design shapes the boom so that the airflow, which primarily from the main rotor downwash, produces lateral lifting loads on the tail boom.

However, these prior approaches have many inherent disadvantages. For instance, the strake and geometry approaches tend to provide insufficient reductions in both the static and dynamic forces exerted on the tail boom. Further, these approaches may increase the download on the boom associated with the rotor downwash, decreasing performance. Being an active system, the NOTAR concept requires significant power to be drawn from the helicopter's engine to eject enough air from the tail boom. The power is used to power a fan which compresses air which is then passed through and out of the tail boom at a longitudinal slot and tip jet.

Therefore, a need exists for a device which provides sufficiently reduced loads on the tail boom such that improved maneuvering of the helicopter can be obtained. To retain acceptable performance of the helicopter, the device must be able to provide the reduced loading without drawing power from the engine.

SUMMARY

The apparatus of the present invention provides a flight vehicle tail assembly having an exterior surface, one or more first or high pressure vents in the exterior surface, one or more second or low pressure vents in the exterior surface, and an air passage connecting the first vent(s) to the second vent(s) allowing air to flow therebetween. The first vent(s) are located at, or at least near, a high air pressure area acting on the exterior surface during a range of predefined flight conditions. Further, the second vent(s) are located at, or at least near, a low air pressure area acting on the exterior surface during the predefined flight conditions. Preferably, the vents run longitudinally along the length of the tail assembly at, or at least near, their respective pressure areas. As such, during the predefined flight conditions, adverse loads on the tail assembly can be reduced by venting air from the high pressure area, through the tail assembly, to the low pressure area.

The first vent(s) can include an air permeable cover positioned to cover at least a portion of the first vent(s) Likewise, the second vent(s) can also include an air permeable cover positioned to cover at least a portion of the second vent(s) Preferably, the air permeable covers are sized to cover the entire openings of each the first and second vent(s).

The tail assembly can include one or more first or high pressure vent doors and/or one or more second or low pressure vent doors. The vent door(s) are mounted to the tail assembly such that in a closed position they can cover the vent(s). Specifically, the first vent door(s) have a first door closed position. With the first vent door(s) in the first door closed position the first vent door(s) cover at least a portion of the first vent(s). Similarly, the second vent door(s) have a second door closed position. With the second vent door(s) in the second door closed position the second vent door(s) cover at least a portion of the second vent(s). Preferably, with these vent doors in their closed positions, their respective vent openings will be covered, and in open positions they will allow air to flow through the vents. The vent doors can include a spring which urges them into the closed position or an actuator which moves the door(s) into either the open or closed positions.

The air passage can be a cavity in the tail assembly defined by the structure of the tail assembly (e.g. skin, support structure, and the like). But, in at least one embodiment, the air passage is defined by a duct mounted within the tail assembly.

The tail assembly can also include one or more strake(s) mounted to the exterior surface and positioned to disrupt airflow across the exterior surface. The strake(s) can be positioned adjacent to either or both the first and second vents to facilitate in directing air in or out, as the case may be, of the vents. Further, with the vent door(s) set to open outward, the vent door(s) also function as strake(s).

The method of the present invention alleviates adverse aerodynamic loads on the flight vehicle tail assembly. The method includes the steps of: receiving air through one or more first or high pressure vents in the exterior surface, passing the air through the tail assembly from the first vent(s) to one or more second or low pressure vent(s) in the exterior surface, and ejecting the air out of the tail assembly at the second vent(s).

BRIEF SUMMARY OF THE DRAWINGS

FIGS. 6a–d are cross-sectional views of flight vehicle tail assembly apparatuses in accordance with the present invention.

DETAILED DESCRIPTION OF THE PREFERRED EMBODIMENTS OF THE INVENTION

Figure 1:
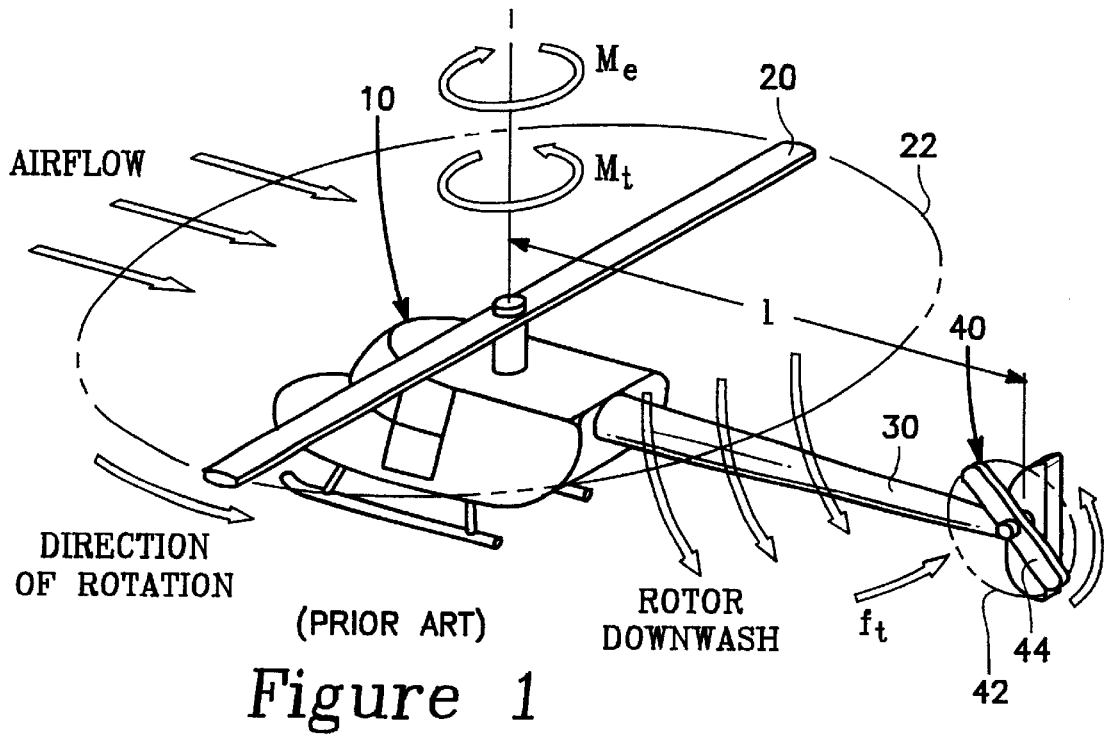
FIG. 1 is an isometric view of a helicopter with a main rotor and a tail rotor.
Figure 2:
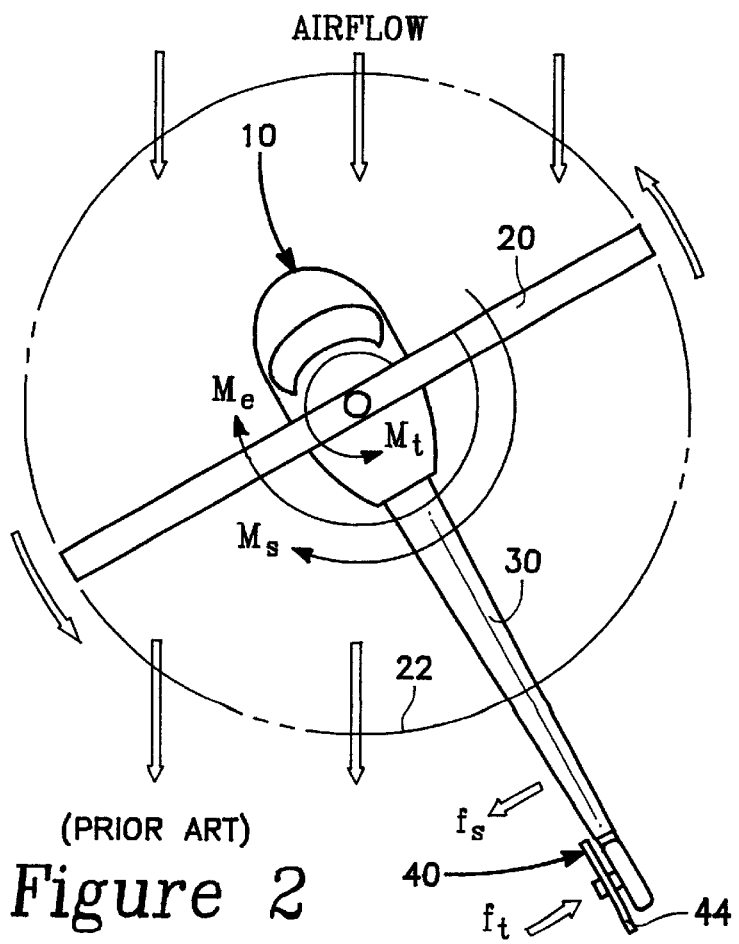
FIG. 2 is a overhead view of a helicopter with the fuselage yawed relative to the airflow.

The present invention is embodied in an apparatus and method for alleviation and control of adverse aerodynamic forces generated on a helicopter tail assembly during flight conditions including, but not limited to, hover, forward, rearward or sideward flight.

In a helicopter with a main rotor, aerodynamic loads are exerted on the tail boom due to the rotor downwash in hover and low speed flight, and/or by the free stream during sideward and sideslipped flight. Depending on which direction the tail boom is moved, the moment created by the aerodynamic forces on the boom can be in the same, or in the opposite direction, of the adverse torque produced by the engine rotating the main rotor. With the boom aerodynamic moment and engine torque applied in the same direction, the tail rotor must exert even more power to counteract the additional torque. This additional power is taken from the engine, which in turn reduces the helicopter's overall performance and uses more fuel. Furthermore, these aerodynamic forces have a significant dynamic component which inflict serious vibrations to the structure that cause stability and control difficulties and can result in costly maintenance.

In at least one embodiment, the present invention consists of either small strips of partially open (porous) material or of open slots running longitudinally down the tail boom. The length and width of these vent slots depend on the actual helicopter design and range of flight conditions for which they are used. Also, the circumferential location of the openings is variable and is generally determined by the local pressure gradients acting around the particular boom. It is preferred that a strip is placed at the region of lowest pressure on the side the boom moves when additional adverse torque is created by the yawing movement. Further, that a strip is placed on the opposite side (not necessarily 180° apart) of the boom at the point of highest pressure. This allows air to flow from the high pressure area, through the boom to the area of low pressure. Because of the natural cavity of the boom, the air flows between the openings without the need for ducting. However, a subsurface (plenum) can be employed to, for example, protect any hardware or equipment located within the boom from the elements. Additionally, one or more, fixed or movable, strake doors can be affixed to one side of the vent openings (either one or both openings) to both channel the flow towards the vents and to control the remaining flow about the boom.

The present invention provides numerous advantages, including control of, and reduction in, the detrimental static forces (even a reverse of the forces under some conditions) which are imparted to the tail boom from airflow across it. Specifically, the vents reduce the sensitivity of side forces with changes in inflow angle. In addition, the invention provides control and alleviation of the dynamic forces, including vibrations, on the boom. Still another advantage of the present invention is that it acts to reduce noise produced the helicopter. The invention is passive in nature so it does not require power to be drawn from the engine.

The Apparatus of the Present Invention

Figure 3:
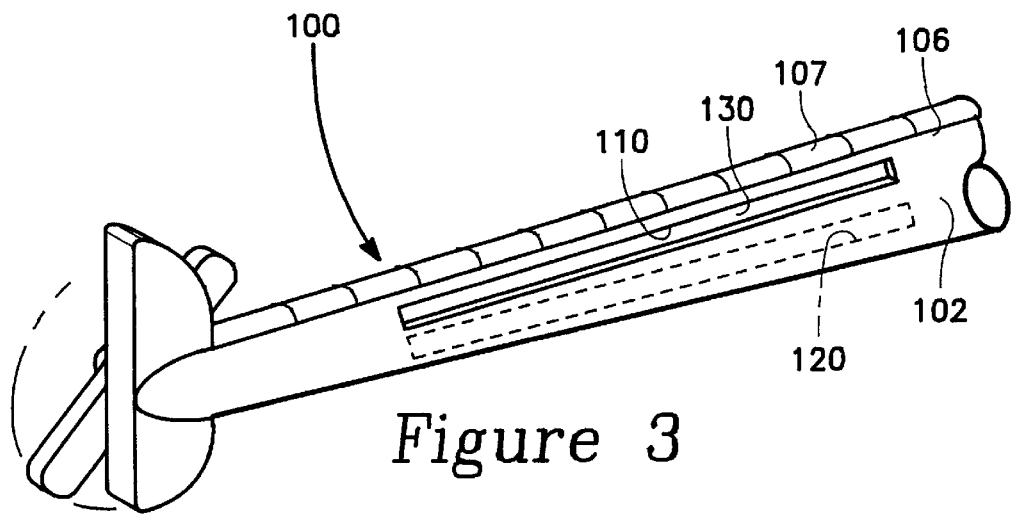
FIG. 3 is an isometric view of a flight vehicle tail assembly apparatus in accordance with the present invention.
Figure 4:
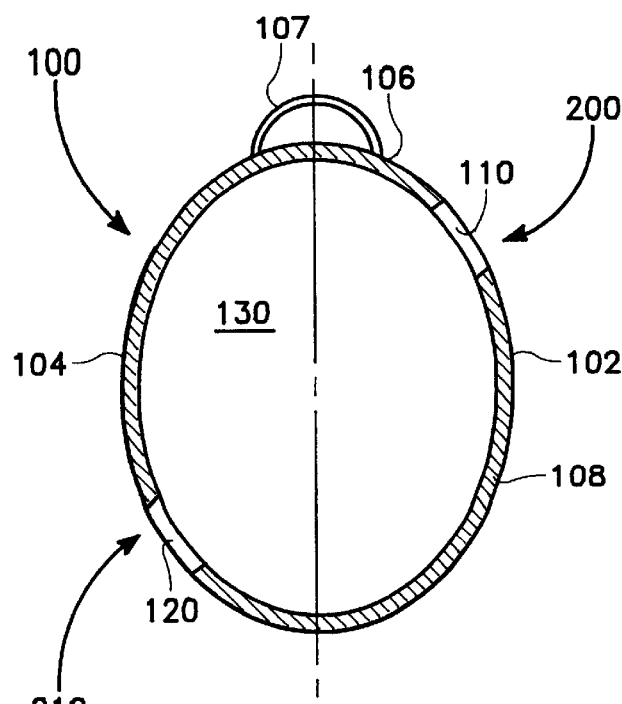
FIG. 4 is a cross-sectional view of a flight vehicle tail assembly apparatus in accordance with the present invention.

As shown in FIGS. 3 and 4, the apparatus of the invention, is embodied in a flight vehicle tail assembly or helicopter tail boom 100 having primary elements including, a first or high pressure vent 110, a second or low pressure vent 120, and a airflow channel 130. FIG. 3 is an isometric view of the tail boom 100 and FIG. 4 is a cross-section of the boom (looking forward).

The helicopter boom 100 also includes a first side wall 102, a second side wall 104, an upper wall 106, and an exterior surface 108. Additionally, depending on the location of the tail rotor drive shaft, a drive shaft cover 107 can be set on the tail boom 100, preferably on the upper wall 106. The drive shaft cover 107 encloses a drive shaft (not shown) which runs from the engine transmission of the helicopter (not shown) back to power the tail rotor or similar device. Among other things, the drive shaft cover 107 functions to protect the drive shaft and shaft bearings (not shown) from the elements (weather, etc.). The tail boom 100 may also include an internal structure, such as ribs, bulkheads, and stringers (not shown), for supporting the tail and carrying loads to and from the tail boom 100. The first side wall 102, second side wall 104, upper wall 106 and drive shaft cover 107 can be any suitable material, such as aluminum, or a composite material. Of course the specific structure and material of the tail boom 100 will depend upon the design requirements from the specific use of the tail boom.

The high pressure vent 110 and the low pressure vent 120 each run longitudinally along the length of the tail boom 100. The high pressure vent 110 is positioned in the first wall 102, through the exterior surface 108. The low pressure vent is in the second wall 104, through the exterior surface 108. The specific placement, length and width of the vents 110 and 120 depend on the design requirements of their use. However, generally the high pressure vent 110 will be placed and sized to be located where a region of high pressure 200 exists during a range of predefined flight conditions. Likewise, the low pressure vent 120 will be placed and sized to be located where a region of low pressure 210 exists during the predefined flight conditions. These pressure areas are shown in FIG. 4.

The range of flight conditions will of course vary with the specifics of the design of the tail boom 100 and the design mission of the helicopter. In the preferred embodiment, the predefined flight conditions will include maneuvers where the airflow about the external surface of the tail boom 100 produces additional adverse torque on the helicopter. One example of such a maneuver is sideward flight where the fuselage of the helicopter is yawed at significant angle relative to the airflow. With the fuselage yawed, the tail boom 100 is placed into the airstream and air flows about or over the exterior surface of the tail boom 100. With the airstream combined with the downward flow of the main rotor, typically a high pressure area 200 forms about the upper portion of the side of the tail boom facing the airstream. Similarly, a low pressure area 210 generally forms on the opposite side of the tail boom 100 from the high pressure area 200 (lower portion of the side of the boom facing away from the airflow). The pressure differential between these high and low pressure areas 200 and 210, causes a side force to be exerted upon the tail boom. The side force acting on the moment arm of the tail boom 100, will produce a moment on the fuselage. Depending on the direction of the yaw of the fuselage, and of the rotation of the main rotor, thus the direction of the engine torque, the tail boom moment may add to or subtract from the overall torque on the helicopter. Because the tail rotor, or similar device, must provide a counteracting moment to keep the helicopter stable, the addition to the engine torque by the tail boom moment, is extremely adverse as the tail rotor must draw additional power from the engine. The present invention reduces the drag loads on the tail boom 100, and in so doing reduces both the adverse tail boom moment and the ultimate power drawn from the engine by the tail rotor. Thus the present invention can provide an increase in the overall helicopter performance.

Of course many variables affect the locations of the high and low pressure areas, including the shape of the tail boom, the direction and strength of the main rotor downwash, the forward speed of the helicopter, the direction and amount of the boom yaw, the structural needs of the boom, and the like. Generally, however the high and low pressure areas are on opposite sides (not necessarily 180° apart) of the boom. Therefore, each specific helicopter design and anticipated flight conditions will dictate a different configuration for the vents. Each such configuration can be determined by one skilled in the art through well known analytical and/or empirical methods. For example, an empirical method could include placing pressure sensors along the surface of a similarly shaped test boom (without vents), which is subjected to the expected flight conditions. The measured pressure levels would provide a profile of the pressure distributions over the surface of the boom, allowing the high and low pressure areas to be easily located.

Figure 5:
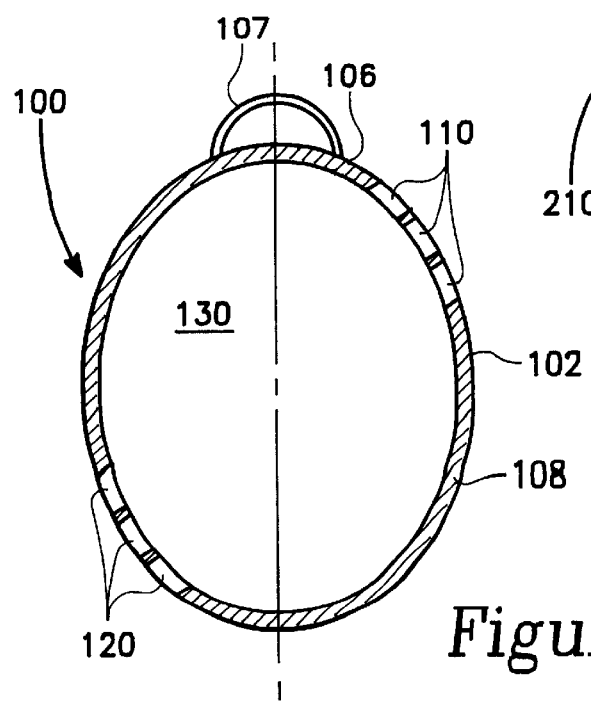
FIG. 5 is a cross-sectional view of a flight vehicle tail assembly apparatus in accordance with the present invention.

Further, the high pressure vent 110 and low pressure vent 120 can vary in size and position along the length of the tail boom to more accurately match their respective low and high pressure areas. In fact, as shown in FIG. 5, more than one set of vents can be used for either the high or low pressure areas.

Other examples of possible sizing and positioning of the high pressure vents 110 and low pressure vents 120 of the boom are shown in FIGS. 6a–d.

Figure 7A:
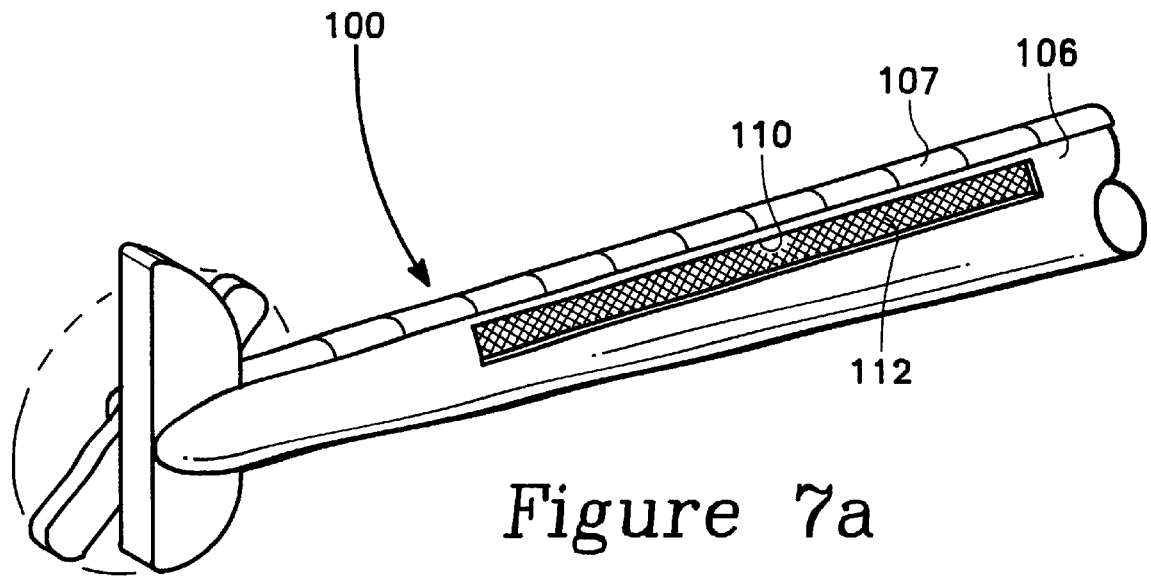
FIGS. 7a and b are isometric views of a flight vehicle tail assembly apparatus in accordance with the present invention.
Figure 7B:
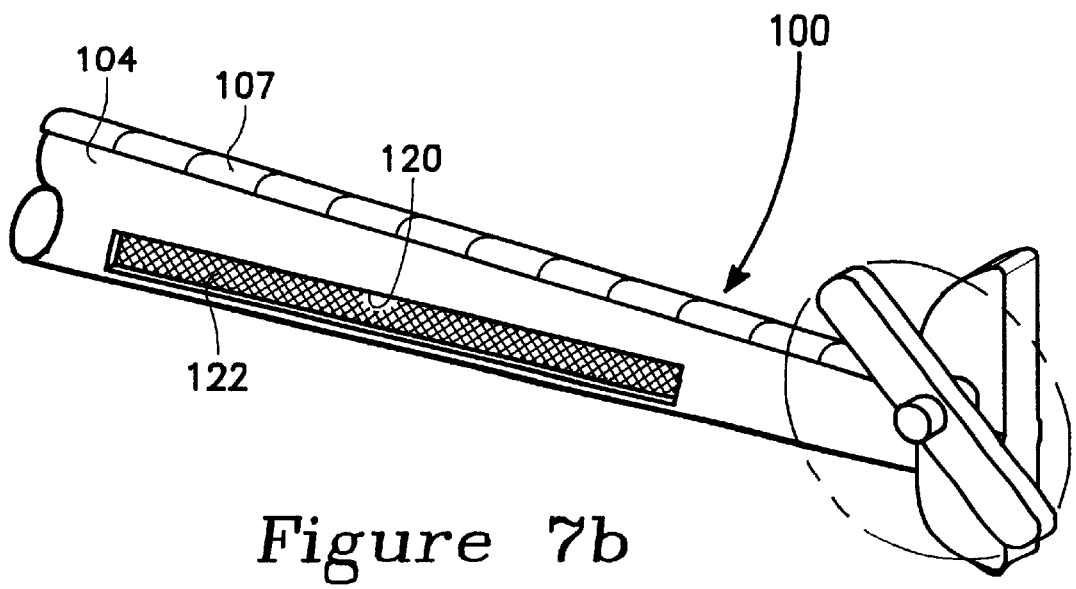

The high pressure vent 110 and low pressure vent 120 are either an opening in the side of the tail boom, as shown in FIGS. 3–6, or is, as preferred, a porous and/or air permeable material covering an opening. As shown in FIG. 7a, the high pressure vent 110 can include a porous cover 112. Likewise, as shown in FIG. 7b, the low pressure vent 120 can include a porous cover 122. The porous cover can be of any suitable material, for example a wire screen, mesh or perforated metal. The porous covers provide the additional benefit of preventing foreign objects from entering the tail boom 100 through the vents 110 and 120. Specifically, the porous cover keeps birds, insects or the like from nesting in the tail boom 100 during periods which the helicopter is not in use.

Figure 8:
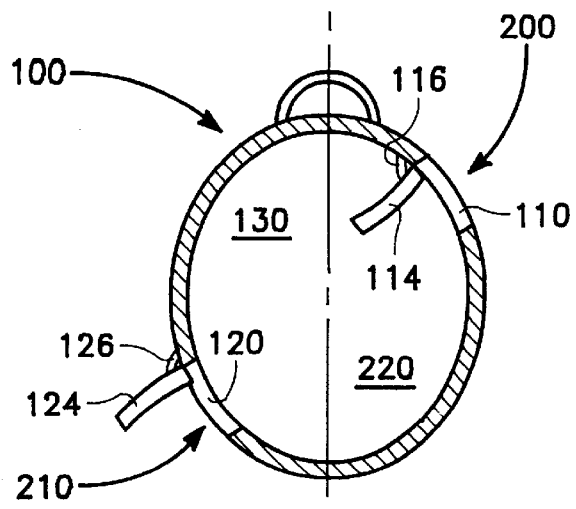
FIG. 8 is a cross-sectional view of a flight vehicle tail assembly apparatus in accordance with the present invention.

Another embodiment involves the addition of doors to either or both the high pressure vent 110 and the low pressure vent 120. A first or high pressure vent door 114 is positioned to cover some or all of the vent opening of the high pressure vent 110. Likewise, a second or low pressure vent door 124 is positioned to cover some or all of the vent opening of the low pressure vent 120. The use of vent doors 114 and 124 is shown in FIG. 8.

The vent doors 114 and 124 can be any of a variety of configurations. For example, the doors can mounted to the tail boom 100 by a hinge, such that the door moves about one end of the door. Alternatively, the doors can be slidably mounted to the tail boom 100 so as to slide from one or both sides of the vents 110 and 120 and cover the vents.

With the doors hinged, the doors 114 and 124 can be set to move either inward towards the airflow channel 130 or outward away from the tail boom 100. That is, both doors 114 and 124 can move inward or outward, or one door can move inward while the outer door moves outward. The doors 114 and 124 can also be set to be limited in their respective movements such that the movement can only be inward or outward to the tail boom 100. The doors 114 and 124 can be set so they will only move in response to an airflow which would otherwise cause an adverse moment to be applied to the helicopter. In this configuration the doors are kept closed by being restrained from swinging to a second open position when the airflow about or over the tail boom 100 is in a direction which imparts an advantageous moment to the helicopter. In other words, when the fuselage is yawed in a direction which the airflow on the tail boom 100 produces a moment which allows less power to be applied to the tail rotor, then the vent doors 114 and 124 remain closed to maintain the advantageous drag loads.

The amount the doors 114 and 124 open can vary with an optimal setting being determined by the specific airflow and pressures of the tail boom design and the range of flight conditions with which the vents are used. The vent doors 114 and 124 can be actuated to provide movement between door positions. The actuation can be any of a variety of well known types including mechanical, electro-mechanical, or hydraulic. The power to operate these doors can be from the helicopter's engine or even from a hand operation by the pilot. The actuators can be placed on a slidable or hinged mounted set of doors.

Alternatively, or in conjunction with an active actuator, a spring mechanism can be set between a door and the tail boom 100 to urge the door towards a closed position. One embodiment of such a spring mechanism is shown in FIG. 8 as spring 116 and spring 126. Spring 116 acts on vent door 114 and spring 126 acts on vent door 124.

In an embodiment with hinged vent doors 114 and 124, and a spring mechanisms 116 and 126 to urge vent doors to their respective closed positions, it is preferred that the high pressure door 114 opens inwards towards the airflow channel 130 and the low pressure door 124 moves outward away from the second side wall 104, as shown in FIG. 8. This arrangement allows the differential pressure from the high pressure area 200, relative to the lower (near ambient) pressure area 220 in the airflow channel 130, to surpass the force exerted on the door 114 by the spring 116 and cause the hinged door 114 to open inward. Likewise, the pressure differential from the pressure area 220 to the lower pressure area 210 overcomes the force applied by the spring 126 on the door 124, to cause the door 124 to open outward. The opening of the doors 114 and 124 facilitates the passage of air from the high pressure area 200 to the low pressure area 210, resulting in a reduction of adverse forces on the tail boom 100.

When the tail boom 100 is not in a flight condition which produces low and high pressure areas the springs 116 and 126 will cause the high pressure door 114 and low pressure door 124, respectfully, to be in a closed position. This provides benefits including reduced drag from air flowing along the tail boom 100 and prevents entrance of foreign objects into the tail boom 100.

Further, in this embodiment stops can be used to prevent the doors from swinging in opposite directions. That is, the use of stops will prevent the high pressure door 114 from moving outward and the low pressure door 124 from moving inward. This provides the advantage of maintaining the advantageous moment on the helicopter produced by drag loads when the tail boom 100 is yawed in an opposition direction from that producing an adverse moment.

In an alternative embodiment, the vent doors 114 and 124 are actuated by a means other than just springs 116 and 126. In such an embodiment, the positioning of the doors can be determined by information obtained from pressure sensors and/or the helicopter's flight instrumentation or flight computer. Vent doors actuated in this manner can be set to open either inward or outward, as needed.

In still other embodiments, either or both of the porous covers 112 and 122 can be used in conjunction with one or the other vent doors 114 and 124. Or the vent doors 114 and 124 themselves can be partially or entirely made of a porous material. Also, a combination of vent door types (hinged, sliding, etc.) can be used with the vents 110 and 120.

Figure 9:
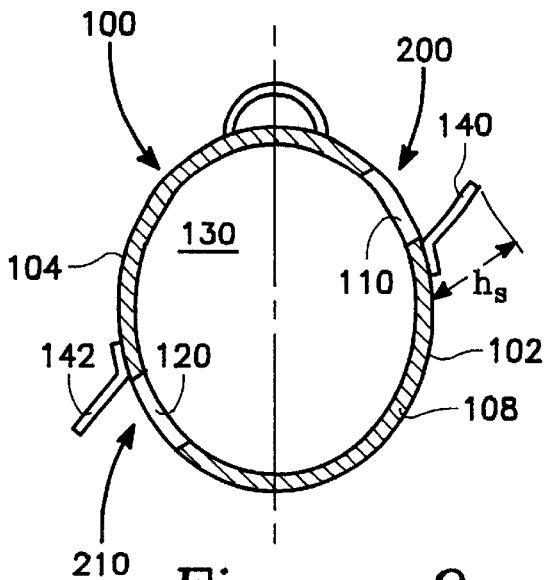
FIG. 9 is a cross-sectional view of a flight vehicle tail assembly apparatus in accordance with the present invention.

The tail boom 100 can also include one or more strakes to spoil the air flow and/or divert the airflow into or out of the vent openings 110 and 120. As shown in FIG. 9, in this embodiment of the invention, a first strake 140 is mounted to the first side wall 102 and a second strake 142 is mounted to the second side wall 104. Each strake projects out and away from its respective side wall, and runs generally longitudinally along the tail boom 100. Although the placement of the strakes 140 and 142 can vary, it is preferred that the strakes 140 and 142 are positioned near the vent openings 110 and 120 to aid in diverting air into and out of the tail boom 100, as shown in FIG. 9. The strakes can be made of any suitable material, such as aluminum or a composite material and are typically L-shaped to aid in mounting. The strakes 140 and 142 can be mounted directly to the exterior surface 108 of the tail boom 100.

The size, shape and positioning of the strakes 140 and 142 depend directly upon the design of the helicopter (e.g. shape of the tail boom, direction of the rotation of the main rotor, and the like), as well as the anticipated range of flight conditions (airspeed, air density, yaw angle and the like). Preferably, the strakes 140 and 142 are positioned and have a height ($h_s$) sufficient to spoil the air flow traveling around the outside of the tail boom generally from the high pressure area 200 to the low pressure area 210. The length of the stakes 140 and 142 along the tail boom of the strakes can also vary depending on their specific use. Further, more than one first strake 140 and more than one second strake 142 can be mounted to the tail boom. The strakes 140 and 142 can be used in combination with one or more of the porous covers 112 and 122 and the vent doors 114 and 124. In at least one embodiment one or both of the vent doors 114 and 124 can be set to open outward and function additionally as strakes.

The other primary element of the present invention is the airflow channel 130. As shown in FIGS. 4–6 and 8–9 the airflow channel 130 is set between the high pressure vent 110 and the low pressure vent 120 and directs airflow between them. As further shown in FIGS. 4–6 and 8–9 the natural cavity shape of the tail boom 100 functions as the airflow channel 130 without the need for any further internal structure such as a plenum or ducting. This is the preferred embodiment of the airflow channel 130 as it provides the benefit of reduced complexity and weight of the tail boom 100.

Figure 10A:
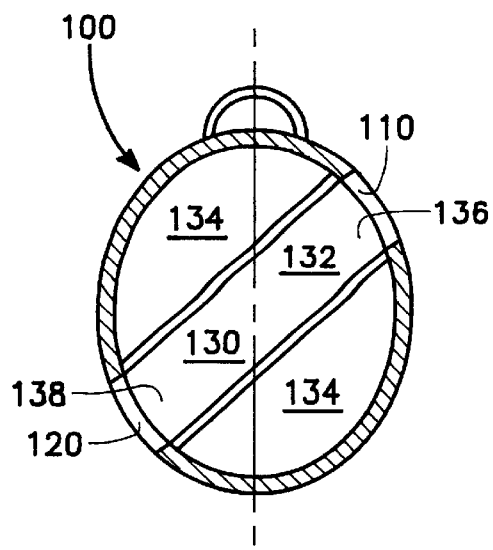
FIGS. 10a and b are cross-sectional views of a flight vehicle tail assembly apparatus in accordance with the present invention.

However, in an alternative embodiment, the airflow channel 130 can include an internal duct 132, as shown in FIG. 10a. The use of the internal duct 132 provides the benefit of preventing foreign objects from entering the unducted portion 134 of the tail boom 100. For example, the internal duct 132 prevents rain from entering the unducted portion 134 by simply channeling the water through the tail boom 100 and out the low pressure vent 120. As such, the internal duct 132 functions to protect any electrical, hydraulic, structural, or similar components in the tail boom 100 from exposure to the elements.

The internal duct 132 can be used in conjunction with either or both porous covers 112 and 122, either or both vent doors 114 and 124, and either or both strakes 140 and 142. The internal duct 132 can be made of any suitable material, including such well known materials as aluminum or composites. The size and shape of the internal duct 132 can vary depending upon the needs of the helicopter design and the range of anticipated flight conditions. However, the size and shape of the internal duct 132 is dependant on the size of the high pressure vent 110 and the low pressure vent 120. Preferably, the internal duct 132 is shaped such that its high pressure end 136 matches the opening of the high pressure vent 110 and the low pressure end 138 of the internal duct 132 matches the opening of the low pressure vent 120. Further, it is preferred that the internal duct 132 is shaped to provide a relatively smooth transition between the high pressure end 136 and the low pressure end 138.

Figure 10B:
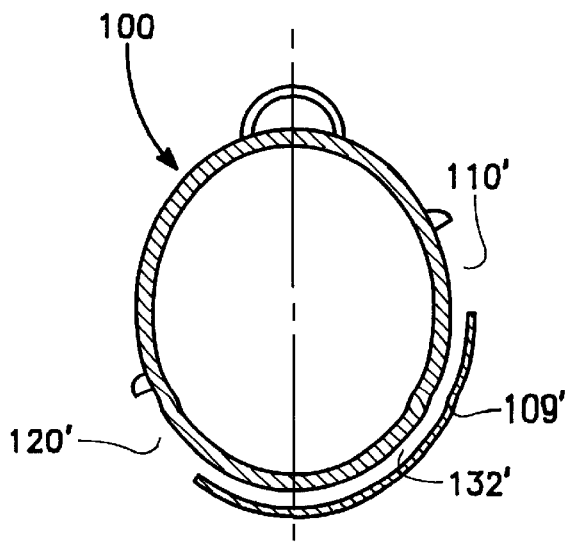

In an another alternative embodiment, the airflow channel is an external plenum 130' having a space or duct 132' set between an inner or original skin 108' and an outer or second skin 109', as shown in FIG. 10b.

The Method of the Present Invention

Figure 11A:
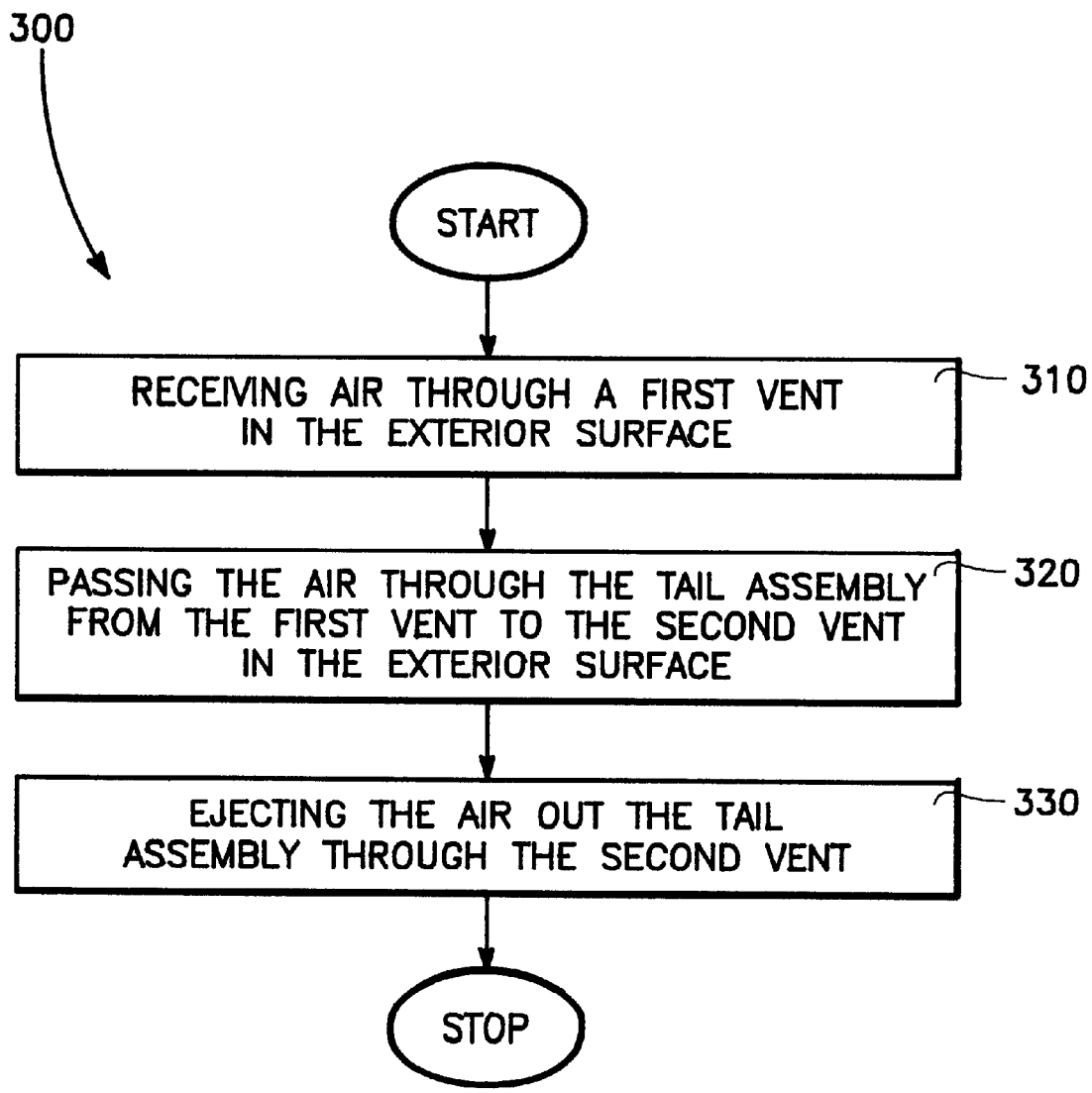
FIGS. 11a–c are flow charts of methods in accordance with the present invention.

The method of the present invention alleviates adverse loads on a flight vehicle tail assembly. As shown in Figure 11a, at least one embodiment of the method 300 includes the steps of: receiving air through a first vent in the exterior surface 310, passing the air through the tail assembly from the first vent to a second vent in the exterior surface 320, and ejecting the air out of the tail assembly the second vent 330.

As detailed above in the description of the apparatus of the invention, the first or high pressure vent 110, can include a first air permeable or porous covering 112 positioned over at least a portion of the first vent 110. Likewise, the second or low pressure vent 120 can include a second air permeable or porous covering 122 positioned over at least a portion of the second vent 120. The air permeable coverings 112 and 122 (e.g. a wire mesh or other suitable material) function to allow passage of air while preventing the entrance of foreign objects into the tail assembly. Preferably, the air permeable coverings 112 and 122 are sized and positioned to cover the entire openings of the first and second vents 110 and 120.

Figure 11B:
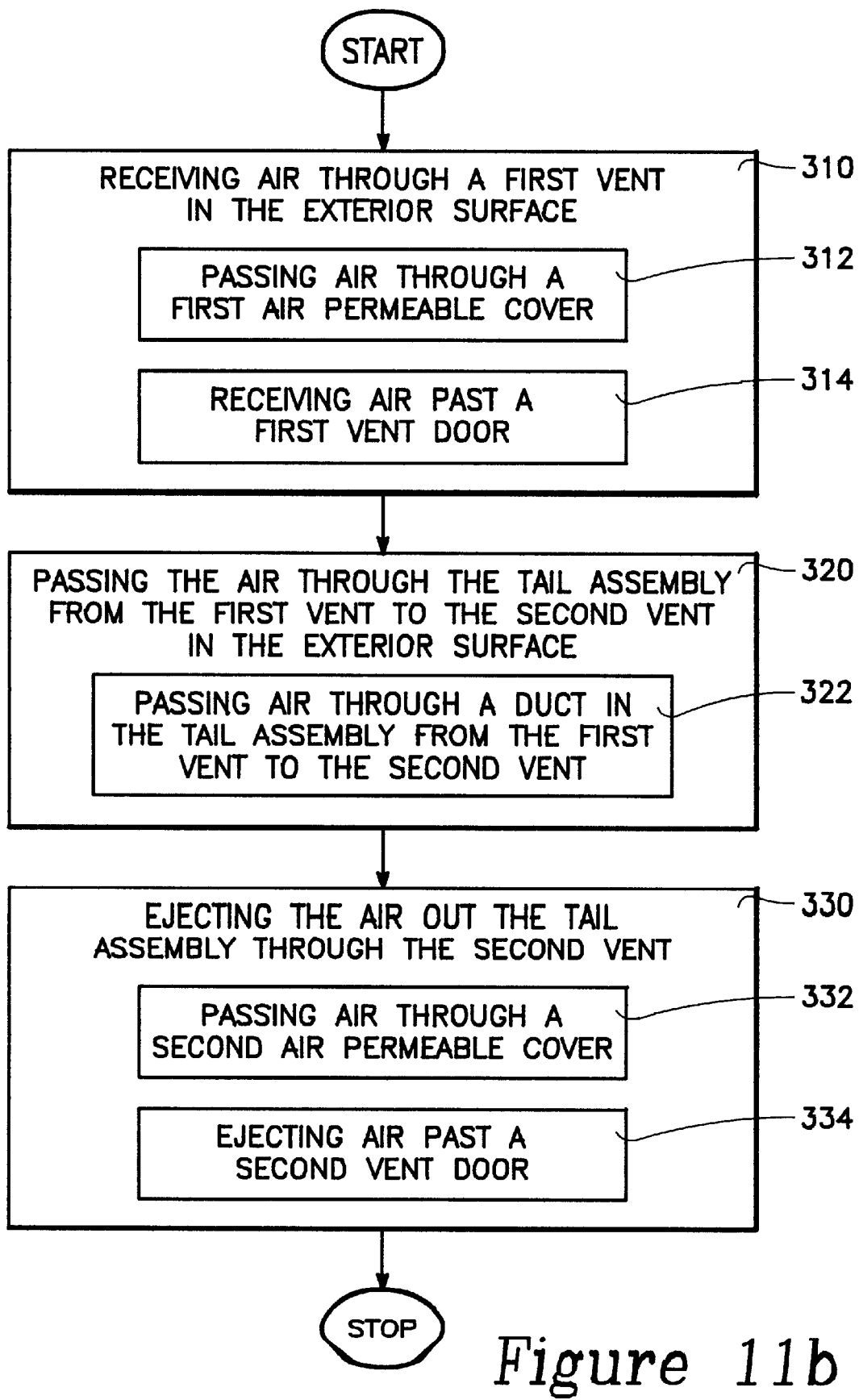

Therefore, in an embodiment of the method where the first vent 110 includes a first air permeable cover 112, the step of receiving air through the first vent in the exterior surface 310 includes the step of passing air through a first air permeable cover 312. Likewise, an embodiment of the method in which the second vent 120 incorporates a second air permeable cover 122, the step of ejecting the air out of the tail assembly at the second vent 330, further includes the step of passing air through a second air permeable cover 332. Both these sub-steps are shown in FIG. 11b.

As also detailed in the description of the apparatus above, the tail assembly 100 can further include a first vent door 114 attached thereto. The first vent door 114 has a first door closed position. With the first vent door in the first door closed position, the first vent door 114 covers at least a portion of first vent 110. In the same manner, the tail assembly can include a second vent door 124 mounted thereto. The second vent door 124 has a second door closed position. With the second vent door 124 in the second door closed position, the second vent door 124 covers at least a portion of second vent 120. In a preferred embodiment, in their respective closed positions the first and second vent doors 114 and 124 cover the entire opening of the vents 110 and 120. In their respective open positions the doors allow the free flow of air into or out of the vents 110 and 120, as the case may be.

In an embodiment having vents door(s), the step of receiving air through a first vent in the exterior surface 310 includes the step of receiving air past a first vent door 314. Further, the step of ejecting the air out of the tail assembly at the second vent 330, includes the step of ejecting air past a second vent door 334. Preferably, each of steps 314 and 334 are performed with the first and second vent doors in their respective open positions. These sub-steps are shown in Figure 11b.

Figure 11C:
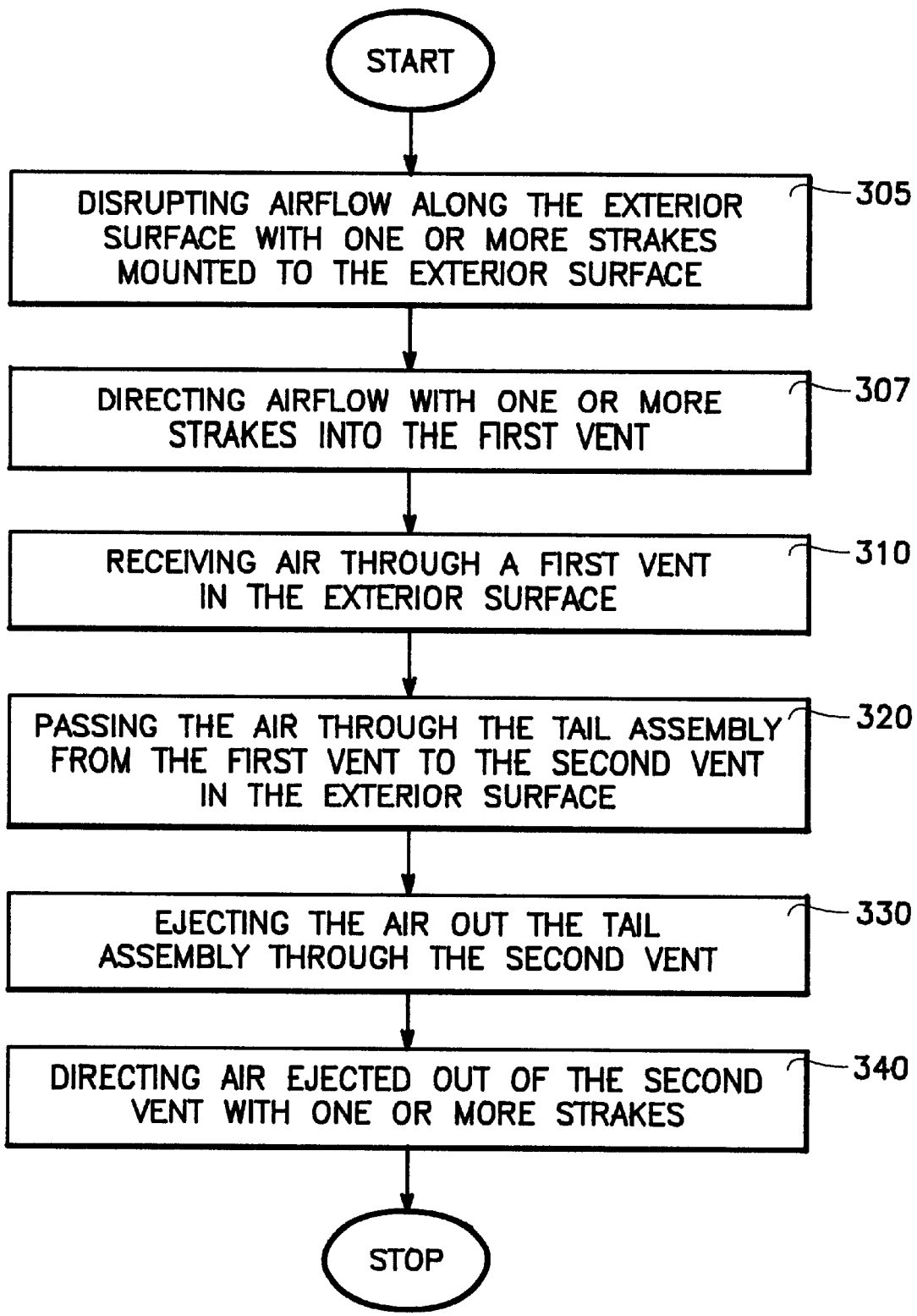

As also described above, the tail assembly can include one or more strakes mounted to the exterior surface and positioned to disrupt airflow along the exterior surface. Similarly, the method of the invention can incorporate the use of the strakes. As shown in FIG. 11c, in such an embodiment, the method 300 further includes the step of disrupting airflow along the exterior surface with one or more strakes mounted to the exterior surface 305. With a strake positioned adjacent to the first vent 110 the method 300 can include the step of directing airflow with one or more strakes into the first vent 307. Also, with a strake positioned adjacent to the second vent 120 the method 300 can include the step of directing air ejected out of the second vent with one or more strakes 340. Preferably, the air flow is directed into the first vent 110 by the first strake 140, and the ejected air is directed after exiting the second vent 120 by the second strake 142, so as to further reduce the adverse loads on the tail assembly 100.

The step of passing the air through the tail assembly from the first vent to a second vent in the exterior surface 320 can include the step of passing air through a duct in the tail assembly from the first vent to the second vent 322, or of passing air through a duct formed between the original skin and a second skin from the first vent to the second vent 322. The duct can be a structure set in the tail assembly. This sub-step is shown in FIG. 11b.

Of course, other alternative embodiments of the method 300 exist, including receiving the air through more than one first vent, using more than one duct to pass the air between the first vent(s) and second vent(s), ejecting the air out more than one second vent, passing the air in through more than one first air permeable convering and out through more than one second air permeable converingt, disrupting the airflow about the exterior surface and/or directing the airflow into the first vent(s) with more than one first strake, and disrupting the airflow about the exterior surface and/or directing the airflow out of the second vent(s) with more than one second strake.

While the preferred embodiments of the present invention have been described in detail above, many changes to these embodiments may be made without departing from the true scope and teachings of the present invention. The present invention, therefore, is limited only as claimed below and the equivalents thereof.

What is claimed is:

1. A flight vehicle tail assembly comprising:

A. an exterior surface;

B. at least one first vent in the exterior surface;

C. at least one second vent in the exterior surface;

D. an air passage connecting the at least one first vent and at least one second vent allowing air to flow therebetween;

wherein the at least one first vent is-located at least near a high air pressure area acting on the exterior surface during a range of predefined flight conditions, and wherein the at least one second vent is located at least near a low air pressure area acting on the exterior surface during said predefined flight conditions; and at least one first vent door attached to the tail assembly, wherein the at least one first vent door has a first door closed position, and wherein with the at least one first vent door is the first door closed position the at least one first vent door covers at least a portion of the at least one first vent.

2. The fight vehicle tail assembly of claim 1, wherein the at least one first vent further comprises an air permeable cover positioned to cover at least a portion of the at least one first vent and wherein the at least one second vent further comprises an air permeable cover positioned to cover at least a portion of the at least one second vent.

3. The flight vehicle tail assembly of claim 1, further comprising at least one second vent door attached to the tail assembly, wherein the at least one second vent door has a second door closed position, and wherein with the at least one second vent door in the second door closed position the at least one second vent door covers at least a portion of the second vent.

4. The flight vehicle tail assembly of claim 1, further comprising at least one second vent door attached to the tail assembly, wherein the at least one second vent door has a second door closed position, and wherein with the at least one second vent door in the second door closed position the at least one second vent door covers at least a portion of the second vent.

5. The flight vehicle tail assembly of claim 1, wherein the air passage is a cavity defined within the tail assembly.

6. The flight vehicle tail assembly of claim 1, further comprising at least one strake mounted to the exterior surface and positioned to disrupt airflow along the exterior surface.

7. The flight vehicle tail assembly of claim 1, wherein the tail assembly further comprises a first end and a second end, wherein the tail assembly is mounted to a flight vehicle fuselage at the first end and to a tail at the second end, and wherein said tail further comprises a yaw control apparatus.

8. The flight vehicle tail assembly of claim 1, wherein the air passage is a cavity defined within an external plenum.

9. A helicopter tail boom for reducing adverse loads during a range of predefined flight conditions, the tail boom having a length, a first end and a second end, wherein the boom is mounted between a helicopter fuselage at the first boom end and a tail at the second boom end, said tail further comprising a yaw control apparatus, the boom comprising:
  A. an exterior surface;
  B. a high pressure vent positioned substantially longitudinally along the length of the boom at least near a high air pressure area acting on the exterior surface during said range of predefined flight conditions;
  C. a low pressure vent positioned substantially longitudinally along the length of the tail boom at least near a low air pressure area acting on the exterior surface during said range of predefined flight conditions; and
  D. an air passage between said high pressure vent and said low pressure vent allowing air to flow therebetween, so that air can pass through the boom from said high pressure area to said low pressure area to cause a reduction of adverse loads on the tail boom.

10. The helicopter tail boom of claim 9, wherein the high pressure vent further comprises a first air permeable covering over at least a portion of the high pressure vent, and wherein the low pressure vent further comprises a second air permeable covering over at least a portion of the low pressure vent.

11. The helicopter tail boom of claim 9, further comprising at least one high pressure door attached to the tail boom, the at least one high pressure door having a high pressure door closed position, and wherein with the at least one high pressure vent door in the high pressure door closed position the at least one high pressure vent door covers at least a portion of the at least one high pressure vent, and at least one low pressure vent door attached to the tail boom, wherein the at least one low pressure vent door has a low pressure door closed position, and wherein with the at least one low pressure vent door in the low pressure door closed position the at least one low pressure vent door covers at least a portion of the low pressure vent.

12. The helicopter tail boom of claim 9, further comprising at least one strake mounted to the exterior surface and positioned to disrupt airflow along the exterior surface.

13. The helicopter tail boom of claim 9, further comprising a first strake mounted to the exterior surface adjacent to the high pressure vent and positioned to disrupt airflow along the exterior surface and channel air into the high pressure vent.

14. The helicopter tail boom of claim 13, further comprising a second strake mounted to the exterior surface and adjacent the low pressure vent.

15. The helicopter tail boom of claim 9, wherein the air passage is a duct.

16. A method for alleviating adverse loads on a flight vehicle tail assembly having an exterior surface, the method comprising:
  A. receiving air through at least one first vent in the exterior surface;
  B. passing the air through the tail assembly from the at least one first vent to at least one second vent in the exterior surface;
  C. ejecting the air out of the tail assembly at the least one second vent; and
    at least one first vent door attached to the tail assembly, the at least one first vent door having a first door closed position, and wherein with the at least one first vent door in the first door closed position the at least one first vent door covers at least a portion of the at least one first vent, and at least one second vent door attached to the tail assembly, wherein the at least one second vent door has a second door closed position, and wherein with the at least one second vent door in the second door closed position the at least one second vent door covers at least a portion of the second vent.

17. The method of claim 16, wherein the at least one first vent further comprises at least one first air permeable covering positioned over at least a portion of the at least one first vent, and wherein the at least one second vent further comprises at least one second air permeable covering positioned over at least a portion of the at least one second vent.

18. The method of claim 16, further comprising at least one strake mounted to the exterior surface and positioned to disrupt airflow along the exterior surface.

* * * * *